(12) United States Patent
Zhang et al.

(10) Patent No.: US 12,251,871 B2
(45) Date of Patent: Mar. 18, 2025

(54) ROLLER EMBOSSING METHOD FOR FLEXIBLE GRAPHITE POLAR PLATES OF FUEL CELLS

(71) Applicant: Shanghai Shenli Technology Co., Ltd., Shanghai (CN)

(72) Inventors: Yichong Zhang, Shanghai (CN); Xiaojing Chen, Shanghai (CN); Ang Li, Shanghai (CN); Jinjian Zhang, Shanghai (CN); Xiaolei Zhang, Shanghai (CN); Xiaohui Li, Shanghai (CN); Quanquan Gan, Shanghai (CN); Yongzhan Wang, Shanghai (CN); Wei Dai, Shanghai (CN); He Zhang, Shanghai (CN)

(73) Assignee: Shanghai Shenli Technology Co., Ltd., Shanghai (CN)

( * ) Notice: Subject to any disclaimer, the term of this patent is extended or adjusted under 35 U.S.C. 154(b) by 169 days.

(21) Appl. No.: 17/397,999

(22) Filed: Aug. 10, 2021

(65) Prior Publication Data

US 2022/0242034 A1 Aug. 4, 2022

(30) Foreign Application Priority Data

Feb. 2, 2021 (CN) .............................. 202110148623

(51) Int. Cl.
*B29C 59/04* (2006.01)
*B29C 59/00* (2006.01)
(Continued)

(52) U.S. Cl.
CPC ............ *B29C 59/04* (2013.01); *B29C 59/002* (2013.01); *H01M 8/0247* (2013.01); *B29L 2031/3468* (2013.01)

(58) Field of Classification Search
CPC ... B29C 59/04; B29C 55/18; B29C 2059/023; B29C 59/043; B29C 59/046;
(Continued)

(56) References Cited

U.S. PATENT DOCUMENTS 6,604,457 B2 * 8/2003 Klug ...................... B44B 5/024
101/6
6,797,091 B2    9/2004 Lines et al.
(Continued)

FOREIGN PATENT DOCUMENTS

CN    105312324 A  *  2/2016  ............... B21B 1/40
CN    205282569 U  *  6/2016
(Continued)

OTHER PUBLICATIONS

Espacenet machine translation of Shibata et al., WO 2013031854 A1 (Year: 2013).*
(Continued)

*Primary Examiner* — Seyed Masoud Malekzadeh
*Assistant Examiner* — Jennifer L Groux
(74) *Attorney, Agent, or Firm* — JCIP GLOBAL INC.

(57) ABSTRACT

A roller embossing method for flexible graphite polar plates of fuel cells comprises: (1) adjusting a clearance of an embossing roller pair of a roller press to a target thickness value of a monopolar plate; (2) feeding a flexible graphite slab in front of the embossing roller pair, and entangling the flexible graphite slab by means of opposite rotation of the embossing roller pair; (3) after the slab is entangled, continuing to forward roll the slab for 10-100 mm, and then reversely rolling the slab for 5-90 mm by means of synchronous and opposite rotation of an upper and a lower embossing roller, wherein one time of forward rolling and one time of reverse rolling are referred to as reciprocal rolling; (4) forming a polar plate after several times of
(Continued)

reciprocal rolling, and separating the polar plate from the embossing rollers; (5) performing subsequent treatment on the roll-formed flexible graphite polar plate.

6 Claims, 3 Drawing Sheets

(51) Int. Cl.
  *B29L 31/34* (2006.01)
  *H01M 8/0247* (2016.01)
(58) Field of Classification Search
  CPC ....... B29C 43/08; B29C 43/085; B30B 11/18; B30B 9/28; B21H 8/005; B31F 1/07; B21B 1/227; B21B 1/32; B21B 1/40; B21B 3/00; B21B 3/02; B21B 2003/001; B21B 2003/005; B21B 2003/006; B21B 37/00; B21B 1/36; B21D 13/04; B21D 22/08; B21D 17/04; B44B 5/0047
  USPC .................................................. 264/104, 105
  See application file for complete search history.

(56) References Cited

U.S. PATENT DOCUMENTS

| | | | |
|---|---|---|---|
| 6,818,165 B2 | 11/2004 | Gallagher | |
| 7,334,446 B1* | 2/2008 | Bauder | B21B 1/32 72/197 |
| 2002/0064702 A1* | 5/2002 | Gibb | H01M 8/0247 264/293 |
| 2003/0160357 A1* | 8/2003 | Gallagher | H01M 8/026 264/173.1 |
| 2004/0072055 A1* | 4/2004 | Getz | H01M 8/04074 429/514 |
| 2007/0117001 A1* | 5/2007 | Farrington | H01M 8/0267 429/514 |
| 2010/0330267 A1* | 12/2010 | Shimizu | H01M 4/0409 427/77 |
| 2015/0189792 A1* | 7/2015 | Kenna | H05K 7/2039 29/890.03 |
| 2020/0168918 A1* | 5/2020 | Berner | H01M 8/0267 |

FOREIGN PATENT DOCUMENTS

| | | | | |
|---|---|---|---|---|
| CN | 105514460 B | * | 12/2017 | |
| CN | 109514904 A | * | 3/2019 | |
| CN | 112126821 A | * | 12/2020 | ............... B21B 1/40 |
| WO | WO-2013031854 A1 | * | 3/2013 | ................ B22F 3/18 |

OTHER PUBLICATIONS

Espacenet machine translation of Wang et al., CN 105514460 B (Year: 2017).*

* cited by examiner

ROLLER EMBOSSING METHOD FOR FLEXIBLE GRAPHITE POLAR PLATES OF FUEL CELLS

CROSS-REFERENCE TO RELATED APPLICATION

The present application is based on and claims the priority benefits of China application No. 202110148623.3, filed on Feb. 2, 2021. The entirety of the above-mentioned patent application is hereby incorporated by reference herein and made a part of this specification.

BACKGROUND

Technical Field

The invention relates to fuel cells, in particular to a roller embossing method for flexible graphite polar plates of fuel cells.

Description of Related Art

Bipolar plates of fuel cells are typically made of metal and graphite at present, wherein graphite bipolar plates occupy a large market share because of their excellent corrosion resistance. The graphite bipolar plates are generally machined by the following three techniques: flow fields are carved on artificial graphite plates by CNC to machine polar plates, thermoplastic resin mixed with carbon powder is hot-pressed to form hot-molded polar plates, and flexible graphite is compression-molded and is then impregnated with resin to form flexible graphite polar plates. Wherein, the flexible graphite polar plates are lowest in price and have molding efficiency much higher than that of the other two types of polar plates. With the gradual increase of the turnover in the fuel cell industry, the production efficiency of the polar plates needs to be greatly improved, so the flexible graphite polar plates have become a major development trend of the polar plates of fuel cells in the future.

U.S. Pat. No. 6,797,091B2 introduces a vacuum flat-embossing method for flexible graphite plates, which was applied for by Ballard POWER SYSTEMS in 2000 and put forward, for the first time, the vacuum flat-embossing process for preparing flexible graphite polar plates, which has been successfully used for production. However, flexible graphite bipolar plates prepared by existing production methods have the problems of high manual participation in the processes of manual plate placement, manual demolding, and the like, thus leading to low efficiency and inconsistency in the production process of the polar plates. In addition, the vacuum process needed during the compression molding process leads to a long molding time and manual demolding, so that continuous and automatic formation cannot be realized in the true sense. To realize continuous and automatic production to improve the output efficiency of polar plates and reduce manual participation, it is a crucial breakthrough to introduce the rolling process into the production of flexible graphite polar plates. On the basis of this idea, Ballard POWER SYSTEMS submitted U.S. Pat. No. 6,818,165B2 in 2002, which introduces a method for machining polar plates with flexible graphite directly by roller embossing. However, due to many technical and cost problems, this method is merely put forward as a concept and is not applied to actual production.

The outstanding advantages of the rolling process have attracted a large number of researchers, and related enterprises and academic institutions participate in the development of the rolling process of polar plates of fuel cells one after another. Although the rolling process can greatly improve the production efficiency and the automation degree compared with the flat-pressing process, public data and research results show that existing rolling processes under study have the following problems: 1, the forming quality is poor, the deviation of an actual value of the channel depth and a design value is too large (the deviation ratio is greater than 25%), and polar plates have serious defects such as blisters; 2, the thickness of the polar plates is too large (the thickness of monopolar plates is over 7 mm); 3, the landing width is too large (>0.8 mm), the channel depth is too small (<0.3 mm), the center distance of the landing is too large (>1.5 mm), and the draft angle is too large (>30°). Because of these problems, the existing rolling processes cannot product flexible graphite polar plates applied to vehicle fuel cells.

As is known to all, the vehicle fuel cells require a higher volume power density, which means that thinner bipolar plates need to be prepared. The thickness of flexible graphite bipolar plates fabricated by leading enterprises through the flat-pressing process is generally smaller than 2 mm, and the thickness of flexible graphite bipolar plates fabricated by part of the enterprises is smaller than 1.6 mm. In addition, the vehicle fuel cells are hydride-air fuel cells rather than hydride-oxygen fuel cells, so the polar plates applied to the vehicle fuel cells should be designed with a narrow landing, a small center distance, a large channel depth and a small draft angle, which drastically increases the filling difficulty in the forming process of the polar plates. How to realize continuous and highly-automatic production of ultra-thin flexible graphite polar plates by the rolling process is an international problem that is still not be solved in 20 years up to now since its proposal as a concept.

SUMMARY

The objective of the invention is to overcome the defects of the prior art by providing a roller embossing method for flexible graphite polar plates of fuel cells to realize continuous, automatic and efficient production of ultra-thin inductile flexible graphite polar plates with a narrow landing, a short center distance, a large channel depth and a small draft angle.

The objective of the invention may be fulfilled through the following technical solution: according to a roller embossing method for flexible graphite polar plates of fuel cells, an embossing roller pair in mirror symmetry is manufactured according to structural features of patterns of a polar plate to be formed and is assembled on a roller press to be applied to a continuous production line to produce the polar plate, and the method comprises the following steps:

step (1) Adjusting a clearance of the embossing roller pair of the roller press to a target thickness value of a monopolar plate;

step (2) feeding, by a feed device, a flexible graphite slab in front of the embossing roller pair, and entangling the flexible graphite slab by means of opposite rotation of the embossing roller pair;

step (3) after the flexible graphite slab is entangled, continuing to forward roll the slab for 10-100 mm, and then reversely rolling the flexible graphite slab for 5-90 mm by means of synchronous and opposite rotation of an upper embossing and a lower embossing roller, wherein one time of forward rolling and one time of reverse rolling are referred to as one time of reciprocal rolling;

step (4) forming a polar plate after several times of reciprocal rolling, and separating the polar plate from the embossing rollers; and step (5) performing subsequent treatment on the rolled flexible graphite polar plate.

Wherein, the target thickness value of the monopolar plate is 0.4-1.2 mm.

The embossing roller pair comprises the upper embossing roller and the lower embossing roller that are arranged in a mirror symmetry manner, the diameter of the embossing rollers is 200-600 mm, the upper embossing roller and the lower embossing roller of the roller press are driven by two servo motors, respectively, so that high synchronization of embossing is guaranteed.

In step (1), the roller press is adjusted to accurately align the embossing roller pair in a front-back direction and a left-right direction to avoid deviations of flow fields of the rolled flexible graphite polar plate.

In step (2), the feed speed of the feed device is 5-75 s/piece.

In step (3), during each time of reciprocal rolling, a reverse rolling distance is 5-10 mm smaller than a forward rolling distance to ensure that the flexible graphite slab is able to move forwards after each time of reciprocal rolling.

In step (4), the forward rotation speed of the embossing rollers is 3-30 cm/s, and the reverse rotation speed is equal to the forward rotation speed.

During multiple times of reciprocal rolling, a clearance between the upper embossing roller and the lower embossing roller is equal to the thickness of the plate to be prepared and remains unchanged in the rolling process, and the rolling pressure is 3-25 ton.

When the polar plate is produced by a set distance (set according to the actual production condition, such as 3000-6000 m) by multiple times of reciprocal rolling, the roller press returns to an original point.

In step (5), the subsequent treatment includes cutting, impregnating, and the like.

Compared with the prior art, the invention has the following beneficial effects.

1. A reversible roller press is used, is driven by two servo motors, and returns to the original position when reaching calibration requirements after continuous operation, and a pair of embossing rollers with patterns of a to-be-formed polar plate is used for reciprocal rolling of the flexible graphite slab, so that polar plates with high surface quality and free of quality flaws such as blisters can be continuously produced by roller embossing.

2. The primary machining degree of the flexible graphite slab is in a negative correlation with the secondary forming capacity and is in a positive correlation with air exhaust during secondary forming. The invention effectively solves this contradiction and realizes roll formation of inductile flexible graphite polar plates with a narrow landing, a short center distance, a large channel depth and a small draft angle, the forming condition completely covers the flat-pressing process, and the surface forming quality is better than that of the flat-pressing process for the same plates.

3. The rolling process is used to produce ultra-thin flexible graphite polar plates (the thickness of monopolar plates is 0.4-1.2 mm), so that continuous and highly-automatic production is realized, and the production efficiency is greatly improved.

4. The invention has no limitation to the type of plates or the structure of flow fields, and all plate designs implemented by the flat-pressing process can be realized by the rolling process of the invention.

In the figures: 1, upper embossing roller; 11, polar plate pattern corresponding to upper embossing roller; 2, lower embossing roller; 21, polar plate pattern corresponding to lower embossing roller; 3, non-rolled flexible graphite slab; 4, rolled flexible graphite slab; 5, upper embossing roller; 51, polar plate pattern corresponding to upper embossing roller; 6, lower embossing roller; 61, polar plate pattern corresponding to lower embossing roller.

DESCRIPTION OF THE EMBODIMENTS

The embodiments of the invention will be described in detail below and are implemented on the basis of the technical solution of the invention. Detailed implementations and specific operation processes are given below. But, the protection scope of the invention is not limited to the following embodiments.

Embodiment 1

Figure 1:
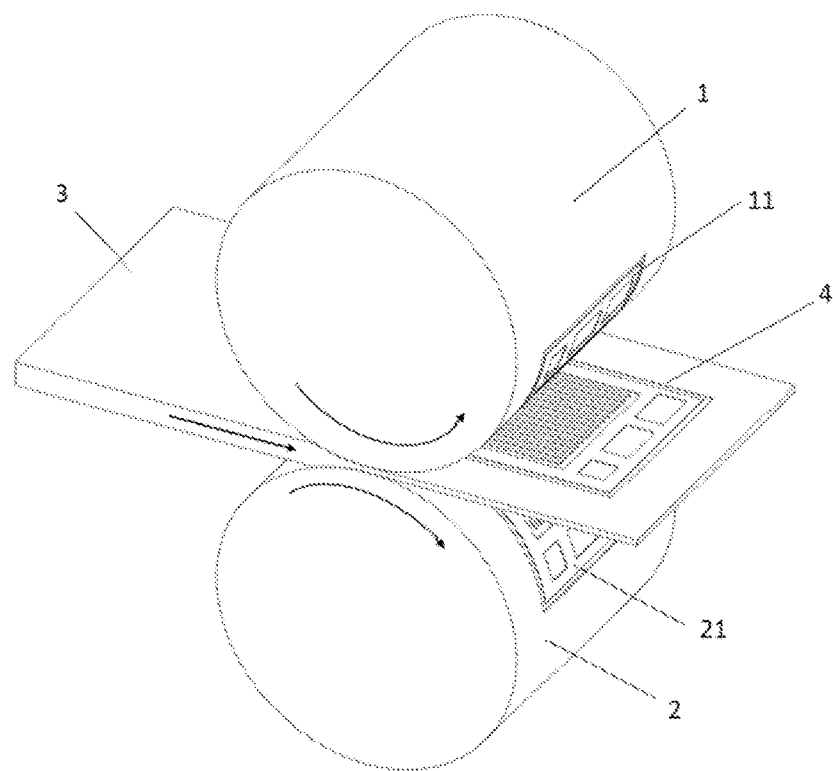
FIG. 1 is a schematic diagram of primary forward rolling of a reciprocal roller embossing process of the invention.

A rolled flexible graphite monopolar plate with a thickness of 0.75 mm and a length of 300 mm was prepared by means of an embossing roller pair, shown in FIG. 1, which comprised an upper embossing roller 1 and a lower embossing roller 2, wherein the upper embossing roller 1 was provided with a corresponding polar plate pattern 11, the lower embossing roller 2 was provided with a corresponding polar plate pattern 21, and a lengthwise direction, corresponding to the embossing patterns, the polar plate was parallel to the direction of roller surfaces. A non-rolled flexible graphite slab 3 was placed in front of the embossing roller pair and was formed through the following method.

Step 1: a clearance between the upper embossing roller 1 and the lower embossing roller 1 was adjusted to 0.75 mm.

Step 2: the non-rolled flexible graphite slab 3 was fed between the upper embossing roller 1 and the lower embossing roller 2 by a feed device and was entangled by means of the upper embossing roller 1 and the lower embossing roller 2, that rotate oppositely, to be rolled forward for 30 mm, wherein a rolled flexible graphite slab 4 was shown in FIG. 1.

Figure 2:
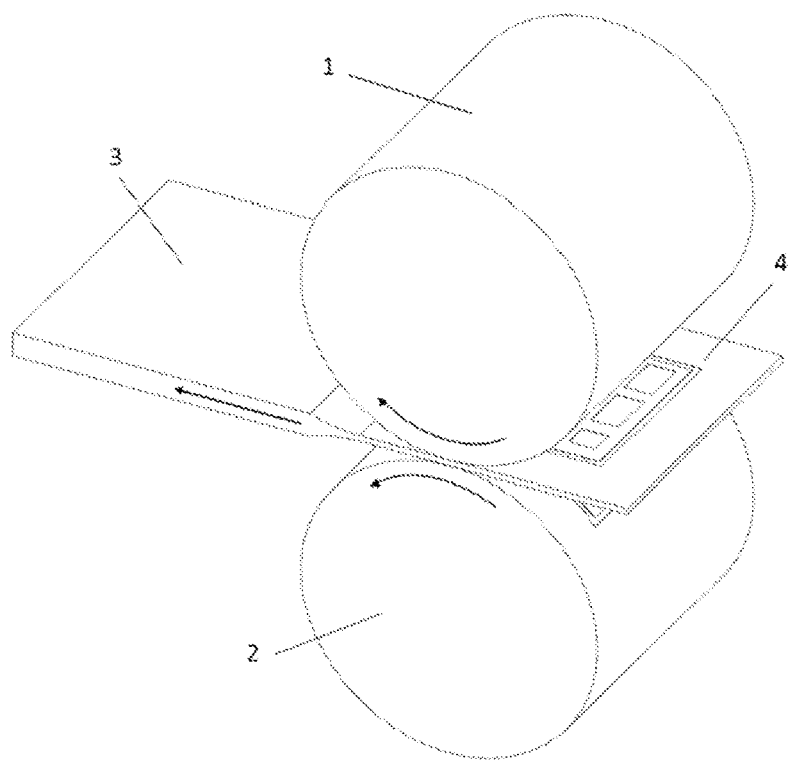
FIG. 2 is a schematic diagram of primary reverse rolling of the reciprocal roller embossing process of the invention.

Step 3: as shown in FIG. 2, the upper embossing roller 1 and the lower embossing roller 2 rotated reversely and drove the flexible graphite slab 3 to be reversely rolled for 20 mm, and at this moment, the embossing patterns of the upper embossing roller 1 and the lower embossing roller 2 partially overlapped with the rolled flexible graphite slab 4.

Figure 3:
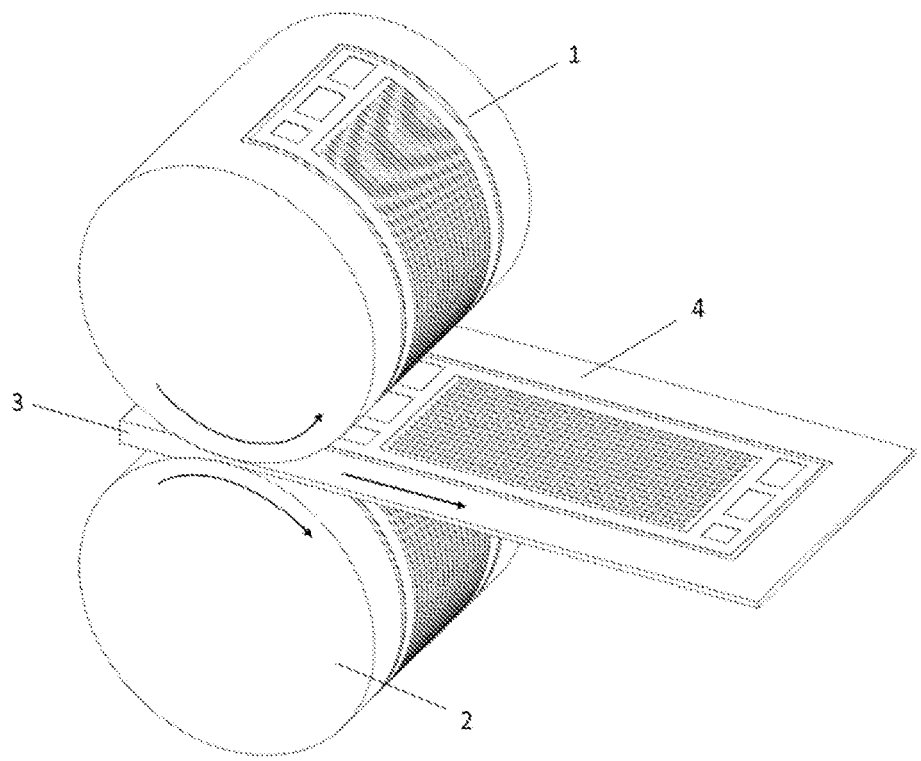
FIG. 3 is a schematic diagram of secondary forward rolling of the reciprocal roller embossing process of the invention.

Step 4: as shown in FIG. 3, the upper embossing roller 1 and the lower embossing roller 2 continued to forward roll the flexible graphite slab 3 for 30 mm.

Figure 4:
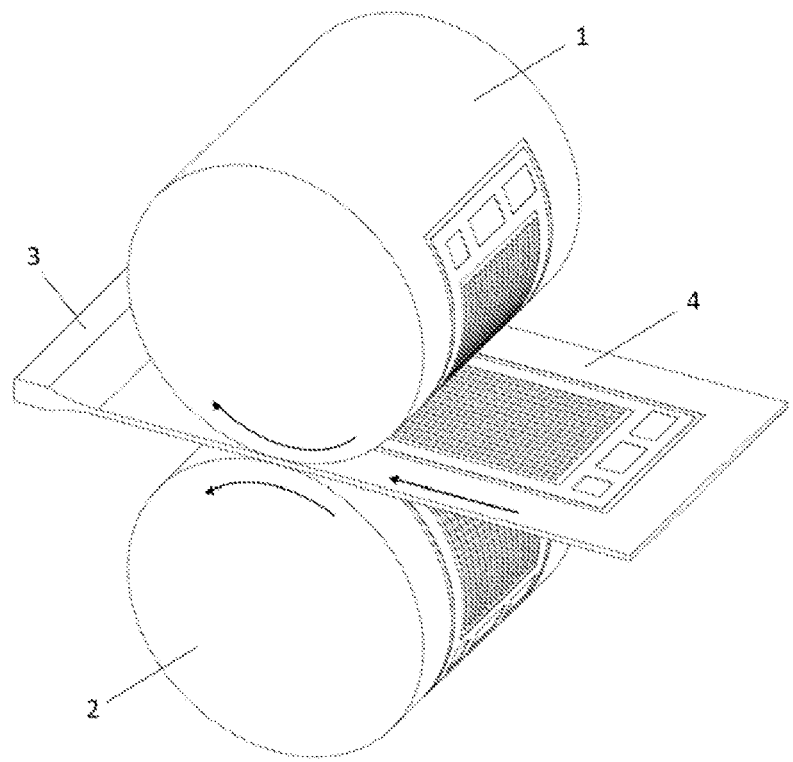
FIG. 4 is a schematic diagram of secondary reverse rolling of the reciprocal roller embossing process of the invention.

Step 5: as shown in FIG. 4, the upper embossing roller 1 and the lower embossing roller 2 continued to reversely roll the flexible graphite slab 3 for 20 mm, and reciprocal rolling was performed 27 times.

Step 6: after 27 times of reciprocal rolling, the flexible graphite slab 4 was further rolled forward, and a rolled polar plate was conveyed out forwards to be separated from the embossing rollers, so that rolling of the polar plate was completed.

Embodiment 2

Figure 5:
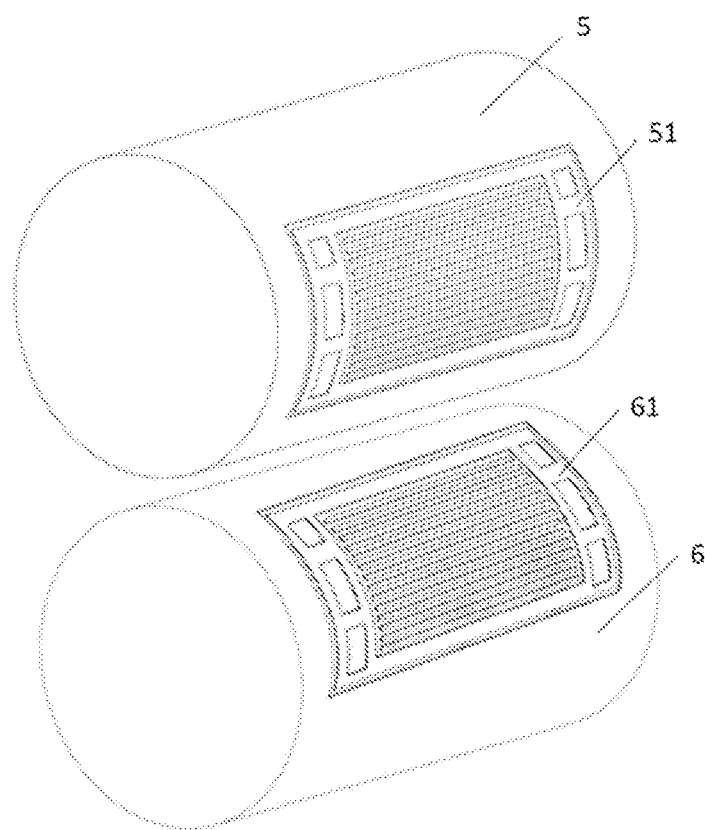
FIG. 5 is a schematic diagram of another type of rolling by embossing rollers of the reciprocal roller embossing process of the invention.

A rolled flexible graphite monopolar plate with a thickness of 1.0 mm and a width of 180 mm was prepared by means of embossing rollers shown in FIG. 5, wherein the embossing rollers comprised an upper embossing roller 5 provided with a corresponding polar plate pattern 51, as well as a lower embossing roller 6 provided with a corresponding polar plate pattern 61, and a lengthwise direction, corresponding to the embossing rollers, of the polar plate was perpendicular to the direction of roller surfaces.

Step 1: a clearance between the upper embossing roller 5 and the lower embossing roller 6 in FIG. 5 was adjusted to 1.0 mm.

Step 2: a flexible graphite slab was fed between the upper embossing roller 5 and the lower embossing roller 6 by a feed device and was entangled by the upper embossing roller 5 and the lower embossing roller 6, that rotate oppositely, to be forward rolled for 50 mm.

Step 3: the upper embossing roller 5 and the lower embossing roller 6 rotated reversely to drive the flexible graphite slab to be reversely rolled for 30 mm, wherein the embossing patterns of the upper embossing roller 5 and the lower embossing roller 6 partially overlapped with polar plate patterns rolled in Step 2.

Step 4: the upper embossing roller 5 and the lower embossing roller 6 continued to forward roll the flexible graphite slab for 50 mm.

Step 5: the upper embossing roller 5 and the lower embossing roller 6 continued to reversely roll the flexible graphite slab for 30 mm, and reciprocal rolling was performed 8 times.

Step 6: after 8 times of reciprocal rolling, the flexible graphite slab was further forward rolled, and a rolled polar plate was conveyed out forwards to be separated from the embossing rollers, so that rolling of the polar plate was completed.

Embodiment 3

According to a roller embossing method for flexible graphite polar plates of fuel cells in this embodiment, in Step 1, a clearance of a roller press provided with a pair of embossing rollers with patterns of a polar plate to be formed was adjusted to a target thickness value 0.4 mm of a monopolar plate, wherein the diameter of the embossing rollers was 200 mm; a flexible graphite slab was roller-embossed multiple times and was then rolled forward for 10 mm; and the slab was reversely rolled for 5 mm.

This embodiment was identical with Embodiment 1 in other aspects.

Embodiment 4

According to a roller embossing method for flexible graphite polar plates of fuel cells in this embodiment, in Step 1, a clearance of a roller press provided with a pair of embossing rollers with patterns of a polar plate to be formed was adjusted to a target thickness value 1.2 mm of a monopolar plate, wherein the diameter of the embossing rollers was 600 mm; a flexible graphite slab was roller-embossed multiple times and was then rolled forward for 100 mm; and the slab was reversely rolled for 90 mm.

This embodiment was identical with Embodiment 1 in other aspects.

The properties of the polar plates prepared through the methods in the above embodiments are as follows:

|  | Embodiment 1 | Embodiment 2 | Embodiment 3 | Embodiment 4 | Detection method |
|---|---|---|---|---|---|
| Landing | 0.6 mm | 0.6 mm | 0.5 mm | 0.5 mm | 3D profilometer |
| Center distance | 1.3 mm | 1.3 mm | 1.2 mm | 1.2 mm | 3D profilometer |
| Channel depth | 0.4 mm | 0.4 mm | 0.42 mm | 0.42 mm | 3D profilometer |
| Draft angle | 20° | 20° | 10° | 10° | 3D profilometer |
| Forming time | 34 s | 15 s | 63 s | 8 s | Stop watch |
| Electrical conductivity | <5 mΩ·cm$^2$ | <5 mΩ·cm$^2$ | <5 mΩ·cm$^2$ | <5 mΩ·cm$^2$ | DC voltage and current source |
| Air-tightness | <0.01 sccm | <0.01 sccm | <0.01 sccm | <0.01 sccm | Leakage detector |
| Mechanical performance | Bending resistance >25 MPa Compression resistance >6 MPa | Bending resistance >25 MPa Compression resistance >6 MPa | Bending resistance >25 MPa Compression resistance >6 MPa | Bending resistance >25 MPa Compression resistance >6 MPa | Universal tensile tester |
| Corrosion resistance | <1 μA/cm$^2$ | <1 μA/cm$^2$ | <1 μA/cm$^2$ | <1 μA/cm$^2$ | Electrochemical workstation |

What is claimed is:

1. A roller embossing method for flexible graphite polar plates of fuel cells, comprising:
   step (1) adjusting a clearance of an embossing roller pair to a target thickness value of a polar plate, wherein the embossing roller pair includes structural features of patterns of the polar plate to be formed, and the embossing roller pair includes an upper embossing roller and a lower embossing roller;
   step (2) feeding a flexible graphite slab in front of the embossing roller pair, and entangling the flexible graphite slab by means of opposite rotation of the embossing roller pair;
   step (3) after the flexible graphite slab is entangled, continuing to forward roll the flexible graphite slab for 10-100 mm, and then reversely rolling the flexible graphite slab for 5-90 mm by means of synchronous and opposite rotation of the upper embossing roller and the lower embossing roller, wherein one time of forward rolling and one time of reverse rolling are referred to as reciprocal rolling;

step (4) forming the polar plate after several times of reciprocal rolling, and separating the polar plate from the embossing roller pair; and step (5) performing subsequent treatment on the rolled flexible graphite polar plate, wherein in the step (3), during each time of reciprocal rolling, a reverse rolling distance is smaller than a forward rolling distance, wherein during the reverse rolling, the structural features of patterns of the polar plate to be formed of the embossing roller pair partially overlapped with polar plate patterns on the flexible graphite slab rolled in the forward rolling.

2. The roller embossing method for flexible graphite polar plates of fuel cells according to claim 1, wherein the target thickness value of the polar plate is 0.4-1.2 mm.

3. The roller embossing method for flexible graphite polar plates of fuel cells according to claim 1, wherein a diameter of the upper embossing roller and a diameter of the lower embossing roller are 200-600 mm.

4. The roller embossing method for flexible graphite polar plates of fuel cells according to claim 1, wherein in the step (3), during each time of reciprocal rolling, the reverse rolling distance is 5-10 mm smaller than the forward rolling distance to ensure that the flexible graphite slab is able to move forwards after each time of reciprocal rolling.

5. The roller embossing method for flexible graphite polar plates of fuel cells according to claim 1, wherein in the step (3), a forward rotation speed of the embossing roller pair is 3-30 cm/s, and a reverse rotation speed is equal to the forward rotation speed.

6. The roller embossing method for flexible graphite polar plates of fuel cells according to claim 1, wherein during multiple times of reciprocal rolling, the clearance between the upper embossing roller and the lower embossing roller is equal to a thickness of the polar plate to be prepared.

* * * * *